US012658131B2

(12) United States Patent
Cha et al.

(10) Patent No.: US 12,658,131 B2
(45) Date of Patent: Jun. 16, 2026

(54) GATE SIGNAL MASKING CIRCUIT FOR LIGHT EMITTING DISPLAY DEVICE REDUCING POWER CONSUMPTION AND REDUCING DEAD SPACE OF DISPLAY DEVICE

(71) Applicant: Samsung Display Co., LTD., Yongin-si (KR)

(72) Inventors: Nahyeon Cha, Yongin-si (KR); Kyungho Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/966,453

(22) Filed: Dec. 3, 2024

(65) Prior Publication Data

US 2025/0232726 A1 Jul. 17, 2025

(30) Foreign Application Priority Data

Jan. 15, 2024 (KR) ........................ 10-2024-0005921

(51) Int. Cl.
*G09G 3/3233* (2016.01)
*G09G 3/32* (2016.01)
*G09G 3/3291* (2016.01)

(52) U.S. Cl.
CPC ............. *G09G 3/3233* (2013.01); *G09G 3/32* (2013.01); *G09G 3/3291* (2013.01);
(Continued)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291
(Continued)

(56) References Cited

U.S. PATENT DOCUMENTS 11,386,852 B2 7/2022 Park et al.
12,277,885 B2 * 4/2025 Kim ......................... G09G 3/20
(Continued)

FOREIGN PATENT DOCUMENTS

KR 1020240068866 A 5/2024

*Primary Examiner* — Ke Xiao
*Assistant Examiner* — Nelson Lam
(74) *Attorney, Agent, or Firm* — CANTOR COLBURN LLP

(57) ABSTRACT

A gate signal masking circuit includes a first switching element including a control electrode connected to a masking control node, a first electrode connected to a first node and a second electrode connected to a control node, a second switching element including a control electrode connected to a second node, a first electrode receiving a first power and a second electrode connected to an intermediate node, a third switching element receiving an enable signal and connected to the intermediate node and a second intermediate node, a fourth switching element receiving the enable signal and connected to the second intermediate node and a third intermediate node, a fifth switching element connected to a third node and the third intermediate node and receiving a second power and a floating switching element receiving a floating control signal and connected to the masking control node and the third intermediate node.

20 Claims, 13 Drawing Sheets

(52) U.S. Cl.
CPC ............... *G09G 2300/0426* (2013.01); *G09G 2300/0819* (2013.01); *G09G 2300/0852* (2013.01); *G09G 2300/0861* (2013.01); *G09G 2320/045* (2013.01); *G09G 2330/021* (2013.01)

(58) Field of Classification Search
USPC ...................................................... 345/76–83
See application file for complete search history.

(56) References Cited

U.S. PATENT DOCUMENTS

| | | | | |
|---|---|---|---|---|
| 12,505,806 | B2 * | 12/2025 | No | G09G 3/3266 |
| 12,518,678 | B2 * | 1/2026 | Kim | G09G 3/32 |
| 2021/0110774 | A1 * | 4/2021 | Cho | G09G 3/3266 |
| 2021/0407429 | A1 * | 12/2021 | Seo | G09G 3/3275 |
| 2022/0165218 | A1 * | 5/2022 | Cho | G09G 3/3275 |
| 2023/0206856 | A1 * | 6/2023 | Kim | G09G 3/3233 345/204 |
| 2023/0260464 | A1 * | 8/2023 | Cho | G09G 3/3266 345/204 |

* cited by examiner

FIG. 10

| | INPUT | | | | OUTPUT |
|---|---|---|---|---|---|
| CONDITION | EN | GB_B[n] | GB[n] | EM[n] | S_node |
| CN1 | HIGH | HIGH | LOW | LOW | HOLD |
| CN2 | HIGH | LOW | HIGH | LOW | LOW |
| CN3 | LOW | HIGH | LOW | LOW | HOLD |
| CN4 | LOW | LOW | HIGH | LOW | HIGH |
| CN5 | · | · | · | HIGH | HOLD |

FIG. 11

| | S2 | S3 | S4 | S5 | SS | OPERATION |
|---|---|---|---|---|---|---|
| CN1 | OFF | OFF | ON | OFF | ON | HOLD |
| CN2 | ON | OFF | ON | ON | ON | NORMAL OUTPUT |
| CN3 | OFF | ON | OFF | OFF | ON | HOLD |
| CN4 | ON | ON | OFF | ON | ON | BLOCK |
| CN5 | · | · | · | · | OFF | HOLD |

GATE SIGNAL MASKING CIRCUIT FOR LIGHT EMITTING DISPLAY DEVICE REDUCING POWER CONSUMPTION AND REDUCING DEAD SPACE OF DISPLAY DEVICE

This application claims priority to Korean Patent Application No. 10-2024-0005921, filed on Jan. 15, 2024, and all the benefits accruing therefrom under 35 U.S.C. § 119, the content of which in its entirety is herein incorporated by reference.

BACKGROUND

1. Field

Embodiments of the invention relate to a gate signal masking circuit, a gate emission driver including the gate signal masking circuit and a display apparatus including the gate emission driver. More particularly, embodiments of the invention relate to a gate signal masking circuit for reducing a power consumption and reducing a dead space, a gate emission driver including the gate signal masking circuit and a display apparatus including the gate emission driver.

2. Description of the Related Art

Generally, a display apparatus includes a display panel and a display panel driver. The display panel includes a plurality of gate lines, a plurality of data lines, a plurality of emission lines and a plurality of pixels. The display panel driver typically includes a gate driver, a data driver and a driving controller. The gate driver outputs gate signals to the gate lines. The data driver outputs data voltages to the data lines. The driving controller controls the gate driver and the data driver.

SUMMARY

In a display device, when an image displayed on the display panel is a static image or the display panel is operated in always on mode, a driving frequency of a display panel may be decreased to reduce a power consumption.

In a display device, when a portion of the image displayed on the display panel is a static image and a portion of the image displayed on the display panel is a moving image, it is desired to reduce a driving frequency of the portion of the display panel corresponding to the static image to further reduce the power consumption.

However, in a conventional display device, since a stage of a gate driver receives an output of a previous stage as a carry signal to output a gate signal, the driving frequency of only a portion of the display panel may not be effectively decreased.

Embodiments of the invention provide a gate signal masking circuit supporting a multiple division of a driving frequency to reduce a power consumption of the display apparatus and to reduce a dead space of the display apparatus.

Embodiments of the invention also provide a gate emission driver including the gate signal masking circuit.

Embodiments of the invention also provide a display apparatus including the gate emission driver.

In an embodiment of a gate signal masking circuit according to the invention, the gate signal masking circuit includes a first switching element, a second switching element, a third switching element, a fourth switching element, a fifth switching element and a floating switching element. In such an embodiment, the first switching element includes a control electrode connected to a masking control node, a first electrode connected to a first input node and a second electrode connected to an output control node. In such an embodiment, the second switching element includes a control electrode connected to a second input node, a first electrode which receives a first power voltage and a second electrode connected to a first intermediate node. In such an embodiment, the third switching element includes a control electrode which receives an enable signal, a first electrode connected to the first intermediate node and a second electrode connected to a second intermediate node. In such an embodiment, the fourth switching element includes a control electrode which receives the enable signal, a first electrode connected to the second intermediate node and a second electrode connected to a third intermediate node. In such an embodiment, the fifth switching element includes a control electrode connected to a third input node, a first electrode connected to the third intermediate node and a second electrode which receives a second power voltage. In such an embodiment, the floating switching element includes a control electrode which receives a floating control signal, a first electrode connected to the masking control node and a second electrode connected to the third intermediate node. In such an embodiment, the second switching element and the third switching element are P-type transistors. In such an embodiment, the fourth switching element and the fifth switching element are N-type transistors.

In an embodiment, the gate signal masking circuit may further include a sixth switching element including a control electrode connected to the output control node, a first electrode which receives the first power voltage and a second electrode connected to a gate output node and a seventh switching element including a control electrode connected to the first input node, a first electrode connected to the gate output node and a second electrode which receives the second power voltage.

In an embodiment, the gate signal masking circuit may further include an eighth switching element including a control electrode connected to the masking control node, a first electrode which receives the first power voltage and a second electrode connected to the output control node.

In an embodiment, the gate signal masking circuit may further include a first capacitor including a first electrode connected to the masking control node and a second electrode which receives the second power voltage.

In an embodiment, the floating control signal may be an emission signal.

In an embodiment, when the floating control signal has a high level, a signal of the masking control node may maintain a previous status.

In an embodiment, a signal of the third input node may be an inverted signal of a signal of the second input node.

In an embodiment, when the enable signal has a high level, a signal of the second input node has a high level and the floating control signal has a low level, a signal of the masking control node may maintain a previous status.

In an embodiment, when the enable signal has a high level, a signal of the second input node has a low level and the floating control signal has a low level, a signal of the masking control node may have a low level.

In an embodiment, when the enable signal has a low level, a signal of the second input node has a high level and the floating control signal has a low level, a signal of the masking control node may maintain a previous status.

In an embodiment, when the enable signal has a low level, a signal of the second input node has a low level and the floating control signal has a low level, a signal of the masking control node may have a high level.

In an embodiment of a gate emission driver according to the invention, the gate emission driver includes a first driver, a second driver, a third driver and a gate signal masking circuit. In such an embodiment, the first driver generates a carry signal of a first gate signal based on a previous carry signal of the first gate signal. In such an embodiment, the second driver generates a second gate signal based on a previous second gate signal. In such an embodiment, the third driver generates an emission signal based on a previous emission signal. In such an embodiment, the gate signal masking circuit controls an output of a gate signal based on an enable signal, a signal of a first input node thereof connected to a gate node of the first driver, a signal of a second input node thereof connected to a gate node of the second driver, a signal of a third input node thereof connected to an output node of the second driver, and the emission signal.

In an embodiment, the gate signal masking circuit may include a first switching element including a control electrode connected to a masking control node, a first electrode connected to the first input node and a second electrode connected to an output control node, a second switching element including a control electrode connected to the second input node, a first electrode which receives a first power voltage and a second electrode connected to a first intermediate node, a third switching element including a control electrode which receives the enable signal, a first electrode connected to the first intermediate node and a second electrode connected to a second intermediate control node, a fourth switching element including a control electrode which receives the enable signal, a first electrode connected to the second intermediate node and a second electrode connected to a third intermediate node, a fifth switching element including a control electrode connected to the third input node, a first electrode connected to the third intermediate node and a second electrode which receives a second power voltage and a floating switching element including a control electrode which receives the emission signal, a first electrode connected to the masking control node and a second electrode connected to the third intermediate node. In such an embodiment, the second switching element and the third switching element may be P-type transistors. In such an embodiment, the fourth switching element and the fifth switching element may be N-type transistors.

In an embodiment, the gate signal masking circuit may further include a sixth switching element including a control electrode connected to the output control node, a first electrode which receives the first power voltage and a second electrode connected to a gate output node, a seventh switching element including a control electrode connected to the first input node, a first electrode connected to the gate output node and a second electrode which receives the second power voltage and an eighth switching element including a control electrode connected to the masking control node, a first electrode which receives the first power voltage and a second electrode connected to the output control node.

In an embodiment, the first driver may include a first first gate switching element including a control electrode which receives one of a first clock signal and a second clock signal, a first electrode which receives the previous carry signal and a second electrode connected to the a first first gate node, a second first gate switching element including a control electrode which receives one of the first clock signal and the second clock signal, a first electrode which receives the previous carry signal and a second electrode connected to the first first gate node, a third first gate switching element including a control electrode connected to the first first gate node, a first electrode which receives the first power voltage and a second electrode connected to a second first gate node, a fourth first gate switching element including a control electrode connected to the first first gate node, a first electrode connected to the second first gate node and a second electrode which receives the second power voltage, a fifth first gate switching element including a control electrode connected to the second first gate node, a first electrode which receives the first power voltage and a second electrode connected to a carry output node and a sixth first gate switching element including a control electrode connected to the second first gate node, a first electrode connected to the carry output node and a second electrode which receives the second power voltage. In such an embodiment, the first first gate switching element, the third first gate switching element and the fifth first gate switching element may be P-type transistors. In such an embodiment, the second first gate switching element, the fourth first gate switching element and the sixth first gate switching element may be N-type transistors. In such an embodiment, the gate node connected to the first input node may be the second first gate node.

In an embodiment, the first driver may include a first first gate switching element including a control electrode which receives one of a first clock signal and a second clock signal, a first electrode which receives the previous carry signal and a second electrode connected to a first first gate node, a third first gate switching element including a control electrode connected to the first first gate node, a first electrode which receives the first power voltage and a second electrode connected to a second first gate node, a fourth first gate switching element including a control electrode connected to the first first gate node, a first electrode connected to the second first gate node and a second electrode which receives the second power voltage, a fifth first gate switching element including a control electrode connected to the second first gate node, a first electrode which receives the first power voltage and a second electrode connected to a carry output node and a sixth first gate switching element including a control electrode connected to the second first gate node, a first electrode connected to the carry output node and a second electrode which receives the second power voltage. In such an embodiment, the first first gate switching element, the third first gate switching element and the fifth first gate switching element may be P-type transistors. In such an embodiment, the fourth first gate switching element and the sixth first gate switching element may be N-type transistors.

In an embodiment, the second driver may include a first second gate switching element including a control electrode which receives one of a first clock signal and a second clock signal, a first electrode which receives the previous second gate signal and a second electrode connected to a first second gate node, a second second gate switching element including a control electrode which receives one of the first clock signal and the second clock signal, a first electrode which receives the previous second gate signal and a second electrode connected to the first second gate node, a third second gate switching element including a control electrode connected to the first second gate node, a first electrode which receives the first power voltage and a second electrode connected to a second second gate node, a fourth second gate switching element including a control electrode connected to the first second gate node, a first electrode connected to the second second gate node and a second electrode which receives the second power voltage, a fifth second gate switching element including a control electrode connected to the second second gate node, a first electrode which receives the first power voltage and a second electrode connected to a second gate output node and a sixth second gate switching element including a control electrode connected to the second second gate node, a first electrode connected to the second gate output node and a second electrode which receives the second power voltage. In such an embodiment, the first second gate switching element, the third second gate switching element and the fifth second gate switching element may be P-type transistors. In such an embodiment, the second second gate switching element, the fourth second gate switching element and the sixth second gate switching element may be N-type transistors. In such an embodiment, the gate node connected to the second input node may be the second second gate node. In such an embodiment, the output node connected to the third input node may be the second gate output node.

In an embodiment, the second driver may include a first second gate switching element including a control electrode which receives one of a first clock signal and a second clock signal, a first electrode which receives the previous second gate signal and a second electrode connected to a first second gate node, a third second gate switching element including a control electrode connected to the first second gate node, a first electrode which receives the first power voltage and a second electrode connected to a second second gate node, a fourth second gate switching element including a control electrode connected to the first second gate node, a first electrode connected to the second second gate node and a second electrode which receives the second power voltage, a fifth second gate switching element including a control electrode connected to the second second gate node, a first electrode which receives the first power voltage and a second electrode connected to a second gate output node and a sixth second gate switching element including a control electrode connected to the second second gate node, a first electrode connected to the second gate output node and a second electrode which receives the second power voltage. In such an embodiment, the first second gate switching element, the third second gate switching element and the fifth second gate switching element may be P-type transistors. In such an embodiment, the fourth second gate switching element and the sixth second gate switching element may be N-type transistors.

In an embodiment of a display apparatus according to the invention, the display apparatus includes a display panel, a gate emission driver and a data driver. In such an embodiment, the display panel includes a pixel. In such an embodiment, the gate emission driver outputs a gate signal and an emission signal to the pixel. the data driver outputs a data voltage to the pixel. In such an embodiment, the gate emission driver includes a first driver which generates a carry signal of a first gate signal based on a previous carry signal of the first gate signal, a second driver which generates a second gate signal based on a previous second gate signal, a third driver which generates the emission signal based on a previous emission signal and a gate signal masking circuit which controls an output of the first gate signal based on an enable signal, a signal of a first input node thereof connected to a gate node of the first driver, a signal of a second input node thereof connected to a gate node of the second driver, a signal of a third input node thereof connected to an output node of the second driver, and the emission signal.

In an embodiment, the third driver may be disposed at a first side of the display panel. In such an embodiment, the first driver and the second driver may be disposed at a second side of the display panel. In such an embodiment, the gate signal masking circuit may receive the emission signal from an outermost pixel of the display panel in a first direction.

According to embodiments of the gate signal masking circuit, the gate emission driver including the gate signal masking circuit and the display apparatus including the gate emission driver, the output of the first gate signal may be controlled based on the enable signal, the signal of the first input node thereof connected to a gate node of the first driver and the signal of the second input node thereof connected to a gate node of the second driver, the signal of the third input node thereof connected to an output node of the second driver and the output signal (e.g. the emission signal) of the third driver such that the multiple division of the driving frequency may be supported.

In such embodiments, the power consumption of the display apparatus may be effectively reduced through the multiple division of the driving frequency. In such embodiments, the multiple division of the driving frequency of the gate signal having two or more pulses may be supported.

In such embodiments, a circuit of the gate emission driver is disposed at a first side of the display panel and another circuit of the gate emission driver is disposed at a second side of the display panel such that the dead space of the display apparatus may be reduced.

BRIEF DESCRIPTION OF THE DRAWINGS

The above and other features of embodiments of the invention will become more apparent by describing in detailed embodiments thereof with reference to the accompanying drawings, in which:

FIG. 10 is a table illustrating a status of a signal of a masking control node according to an input signal of the gate signal masking circuit of FIG. 9;

FIG. 11 is a table illustrating a status of a switching element of the gate signal masking circuit of FIG. 9 and an operation of the gate signal masking circuit of FIG. 9 according to an input signal of the gate signal masking circuit of FIG. 9;

DETAILED DESCRIPTION

Figure 1:
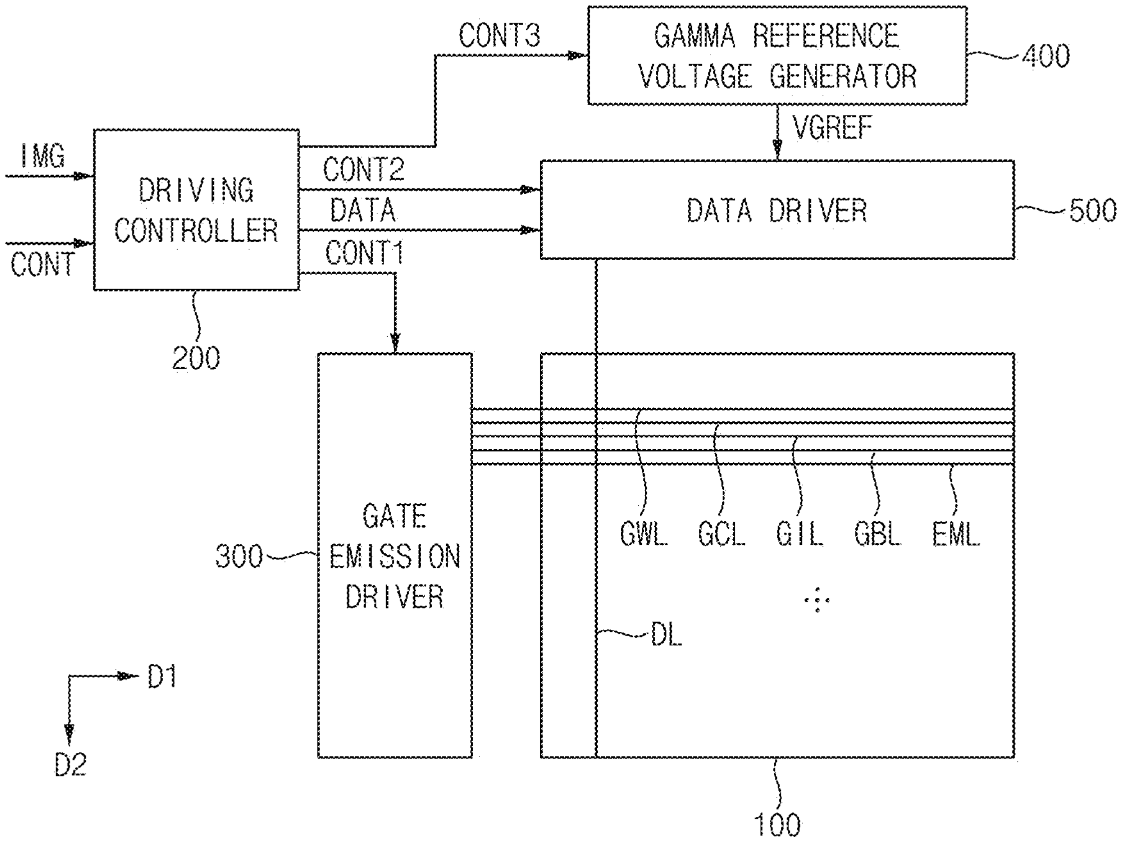
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver. The display panel driver includes a driving controller 200, a gate emission driver 300, a gamma reference voltage generator 400 and a data driver 500.

The display panel 100 has a display region, on which an image is displayed, and a peripheral region adjacent to the display region.

The display panel 100 includes a plurality of gate lines GWL, GCL, GIL and GBL, a plurality of emission lines EML, a plurality of data lines DL and a plurality of pixels electrically connected to the gate lines GWL, GCL, GIL and GBL, the emission lines EML and the data lines DL. The gate lines GWL, GCL, GIL and GBL may extend in a first direction D1, the emission lines EML may extend in the first direction D1 and the data lines DL may extend in a second direction D2 crossing the first direction D1.

The driving controller 200 receives input image data IMG and an input control signal CONT from an external apparatus. In an embodiment, for example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate emission driver 300 based on the input control signal CONT, and outputs the first control signal CONT1 to the gate emission driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate emission driver 300 generates gate signals for driving the gate lines GWL, GCL, GIL and GBL in response to the first control signal CONT1 received from the driving controller 200. The gate emission driver 300 may output the gate signals to the gate lines GWL, GCL, GIL and GBL. The gate emission driver 300 generates emission signals for driving the emission lines EML in response to the first control signal CONT1 received from the driving controller 200. The gate emission driver 300 may output the emission signals to the emission lines EML.

Although an embodiment where the gate emission driver 300 is disposed at a first side of the display panel 100 is shown in FIG. 1 for convenience of illustration and description, the invention may not be limited thereto. In another embodiment, the gate emission driver 300 may be disposed at both sides of the display panel 100. In an embodiment, for example, some portions of the gate emission driver 300 may be disposed at the first side of the display panel 100 and other portions of the gate emission driver 300 may be disposed at a second side of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
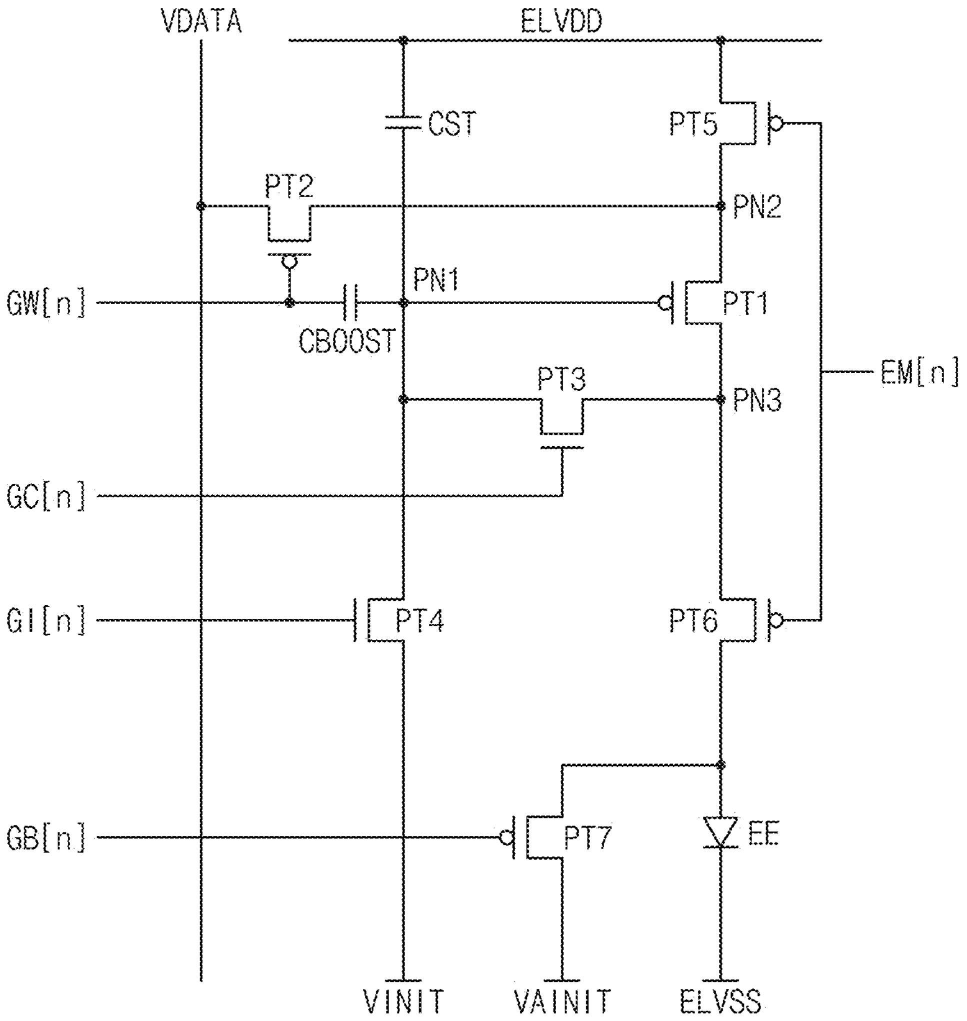
FIG. 2 is a circuit diagram illustrating an example of a pixel of the display panel of FIG. 1.

FIG. 2 is a circuit diagram illustrating an example of a pixel of the display panel 100 of FIG. 1.

Referring to FIGS. 1 and 2, in an embodiment, the display panel 100 includes a plurality of pixels. Each of the pixels includes a light emitting element EE.

The pixel receives a data writing gate signal GW[n], a compensation gate signal GC[n], a data initialization gate signal GI[n], a light emitting element initialization gate signal GB[n], the emission signal EM[n] and the data voltage VDATA, and the light emitting element EE of the pixel emits light corresponding to the level of the data voltage VDATA to display the image.

In an embodiment, the pixel may include a switching element of a first type and a switching element of a second type different from the first type. For example, the switching element of the first type may be a polysilicon thin film transistor. For example, the switching element of the first type may be a low temperature polysilicon (LTPS) thin film transistor. For example, the switching element of the second type may be an oxide semiconductor thin film transistor. For example, the switching element of the first type may be a P-type transistor and the switching element of the second type may be an N-type transistor. Although some of the pixel switching elements are the oxide semiconductor thin film transistors and other pixel switching elements are the polysilicon thin film transistors in an embodiment, the invention may not be limited thereto. Embodiments of the invention described herein may be applied to the pixel including only the oxide semiconductor thin film transistors. Although some of the pixel switching elements are the N-type transistors and other pixel switching elements are the P-type transistors in the embodiment, the invention may not be limited thereto. Embodiments of the invention described herein may be applied to the pixel including only the N-type transistors.

At least one of the pixels may include first to seventh pixel switching elements PT1 to PT7 and the light emitting element EE.

The first pixel switching element PT1 may include a control electrode connected to a first pixel node PN1, a first electrode connected to a second pixel node PN2 and a second electrode connected to a third pixel node PN3. The second pixel switching element PT2 may include a control electrode that receives the data writing gate signal GW[n], a first electrode that receives the data voltage VDATA and a second electrode connected to the second pixel node PN2. The third pixel switching element PT3 may include a control electrode that receives the compensation gate signal GC[n], a first electrode connected to the first pixel node PN1 and a second electrode connected to the third pixel node PN3. The fourth pixel switching element PT4 may include a control electrode that receives the data initialization gate signal GI[n], a first electrode that receives an initialization voltage VINIT and a second electrode connected to the first pixel node PN1. The fifth pixel switching element PT5 may include a control electrode that receives the emission signal EM[n], a first electrode that receives a pixel high power voltage ELVDD and a second electrode connected to the second pixel node PN2. The sixth pixel switching element PT6 may include a control electrode that receives the emission signal EM[n], a first electrode connected to the third pixel node PN3 and a second electrode connected to an anode electrode of the light emitting element EE. The seventh pixel switching element PT7 may include a control electrode that receives the light emitting element initialization gate signal GB[n], a first electrode that receives a light emitting element initialization voltage VAINIT and a second electrode connected to the anode electrode of the light emitting element EE. The light emitting element EE may include the anode electrode and a cathode electrode that receives a pixel low power voltage ELVSS.

The pixel may further include a storage capacitor CST including a first electrode that receives the pixel high power voltage ELVDD and a second electrode connected to the first pixel node PN1 and a boosting capacitor CBOOST including a first electrode that receives the data writing gate signal GW[n] and a second electrode connected to the first pixel node PN1.

In such an embodiment, the signal outputted from a gate signal masking circuit of the gate emission driver 300 may be the data initialization gate signal GI[n]. Alternatively, the signal outputted from the gate signal masking circuit of the gate emission driver 300 may be the compensation gate signal GC[n].

A driving current may flow through the fifth pixel switching element PT5, the first pixel switching element PT1 and the sixth pixel switching element PT6 to drive the light emitting element EE. An intensity of the driving current may be determined by the level of the data voltage VDATA. A luminance of the light emitting element EE may be determined by the intensity of the driving current.

In an embodiment, when the image displayed on the display panel 100 is a static image or the display panel is operated in always on mode, a driving frequency of the display panel 100 may be decreased to reduce a power consumption. In a case where all of the switching elements of the pixel of the display panel 100 are polysilicon thin film transistors, a flicker may be generated due to a leakage current of the pixel switching element in the low frequency driving mode. Thus, some of the pixel switching elements may be designed using the oxide semiconductor thin film transistors. In an embodiment, for example, the third pixel switching element PT3 and the fourth pixel switching element PT4 may be the oxide semiconductor thin film transistors, and the first pixel switching element PT1, the second pixel switching element PT2, the fifth pixel switching element PT5, the sixth pixel switching element PT6 and the seventh pixel switching element PT7 may be the polysilicon thin film transistors.

Figure 3:
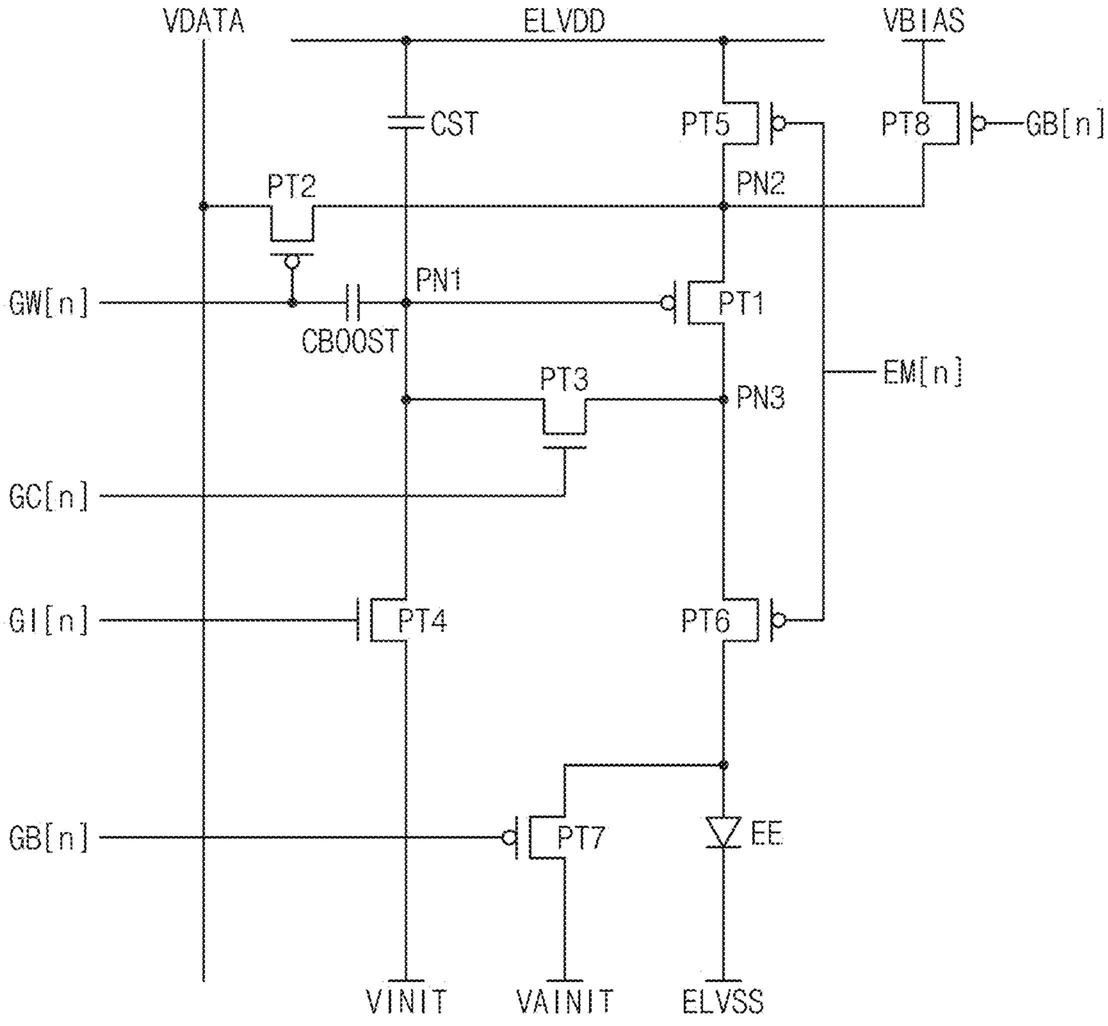
FIG. 3 is a circuit diagram illustrating an example of a pixel of the display panel of FIG. 1.

FIG. 3 is a circuit diagram illustrating an example of a pixel of the display panel 100 of FIG. 1.

Referring to FIGS. 1 and 3, in an embodiment, the display panel 100 includes a plurality of pixels. Each of the pixels includes a light emitting element EE.

The pixel receives a data writing gate signal GW[n], a compensation gate signal GC[n], a data initialization gate signal GI[n], a light emitting element initialization gate signal GB[n], the emission signal EM[n] and the data voltage VDATA and the light emitting element EE of the pixel emits light corresponding to the level of the data voltage VDATA to display the image.

In an embodiment, the pixel may include a switching element of a first type and a switching element of a second type different from the first type. For example, the switching element of the first type may be a polysilicon thin film transistor. For example, the switching element of the first type may be a low temperature polysilicon (LTPS) thin film transistor. For example, the switching element of the second type may be an oxide semiconductor thin film transistor. For example, the switching element of the first type may be a P-type transistor and the switching element of the second type may be an N-type transistor. Although some of the pixel switching elements are the oxide semiconductor thin film transistors and other pixel switching elements are the polysilicon thin film transistors in the embodiment, the invention may not be limited thereto. Embodiments of the invention described herein may be applied to the pixel including only the oxide semiconductor thin film transistors. Although some of the pixel switching elements are the N-type transistors and other pixel switching elements are the P-type transistors in the embodiment, the invention may not be limited thereto. Embodiments of the invention described herein may be applied to the pixel including only the N-type transistors.

At least one of the pixels may include first to eighth pixel switching elements PT1 to PT8 and the light emitting element EE.

The first pixel switching element PT1 may include a control electrode connected to a first pixel node PN1, a first electrode connected to a second pixel node PN2 and a second electrode connected to a third pixel node PN3. The second pixel switching element PT2 may include a control electrode that receives the data writing gate signal GW[n], a first electrode that receives the data voltage VDATA and a second electrode connected to the second pixel node PN2. The third pixel switching element PT3 may include a control electrode that receives the compensation gate signal GC[n], a first electrode connected to the first pixel node PN1 and a second electrode connected to the third pixel node PN3. The fourth pixel switching element PT4 may include a control electrode that receives the data initialization gate signal GI[n], a first electrode that receives an initialization voltage VINIT and a second electrode connected to the first pixel node PN1. The fifth pixel switching element PT5 may include a control electrode that receives the emission signal EM[n], a first electrode that receives a pixel high power voltage ELVDD and a second electrode connected to the second pixel node PN2. The sixth pixel switching element PT6 may include a control electrode that receives the emission signal EM[n], a first electrode connected to the third pixel node PN3 and a second electrode connected to an anode electrode of the light emitting element EE. The seventh pixel switching element PT7 may include a control electrode that receives the light emitting element initialization gate signal GB[n], a first electrode that receives a light emitting element initialization voltage VAINIT and a second electrode connected to the anode electrode of the light emitting element EE. The eighth pixel switching element PT8 may include a control electrode that receives the light emitting element initialization gate signal GB[n], a first electrode that receives a bias voltage VBIAS and a second electrode connected to the second pixel node PN2. The light emitting element EE may include the anode electrode and a cathode electrode that receives a pixel low power voltage ELVSS.

The pixel may further include a storage capacitor CST including a first electrode that receives the pixel high power voltage ELVDD and a second electrode connected to the first pixel node PN1 and a boosting capacitor CBOOST including a first electrode that receives the data writing gate signal GW[n] and a second electrode connected to the first pixel node PN1.

In such an embodiment, the signal outputted from a gate signal masking circuit of the gate emission driver 300 may be the data initialization gate signal GI[n]. Alternatively, the signal outputted from the gate signal masking circuit of the gate emission driver 300 may be the compensation gate signal GC[n].

In an embodiment, when the image displayed on the display panel 100 is a static image or the display panel is operated in always on mode, a driving frequency of the display panel 100 may be decreased to reduce a power consumption. In a case where all of the switching elements of the pixel of the display panel 100 are polysilicon thin film transistors, a flicker may be generated due to a leakage current of the pixel switching element in the low frequency driving mode. Thus, some of the pixel switching elements may be designed using the oxide semiconductor thin film transistors. In an embodiment, for example, the third pixel switching element PT3 and the fourth pixel switching element PT4 may be the oxide semiconductor thin film transistors, and the first pixel switching element PT1, the second pixel switching element PT2, the fifth pixel switching element PT5, the sixth pixel switching element PT6, the seventh pixel switching element PT7 and the eighth pixel switching element PT8 may be the polysilicon thin film transistors.

Figure 4:
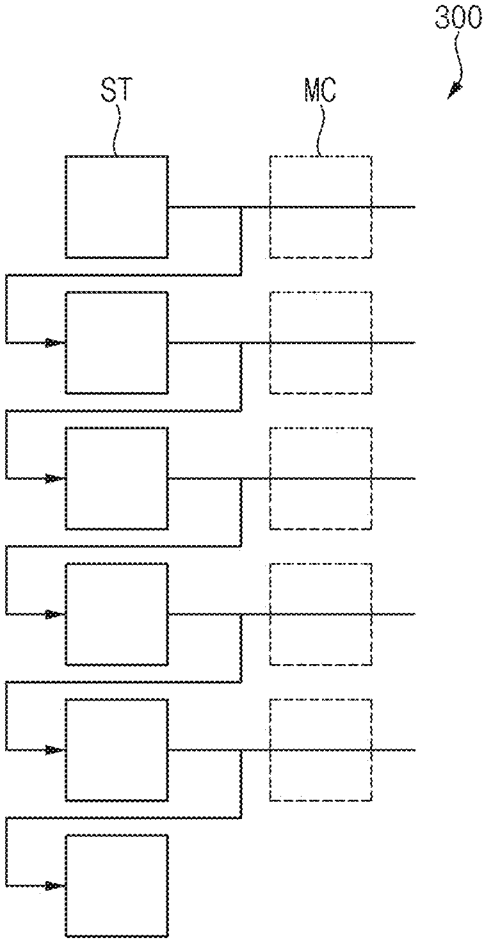
FIG. 4 is a conceptual diagram illustrating a gate emission driver of FIG. 1.
Figure 5:
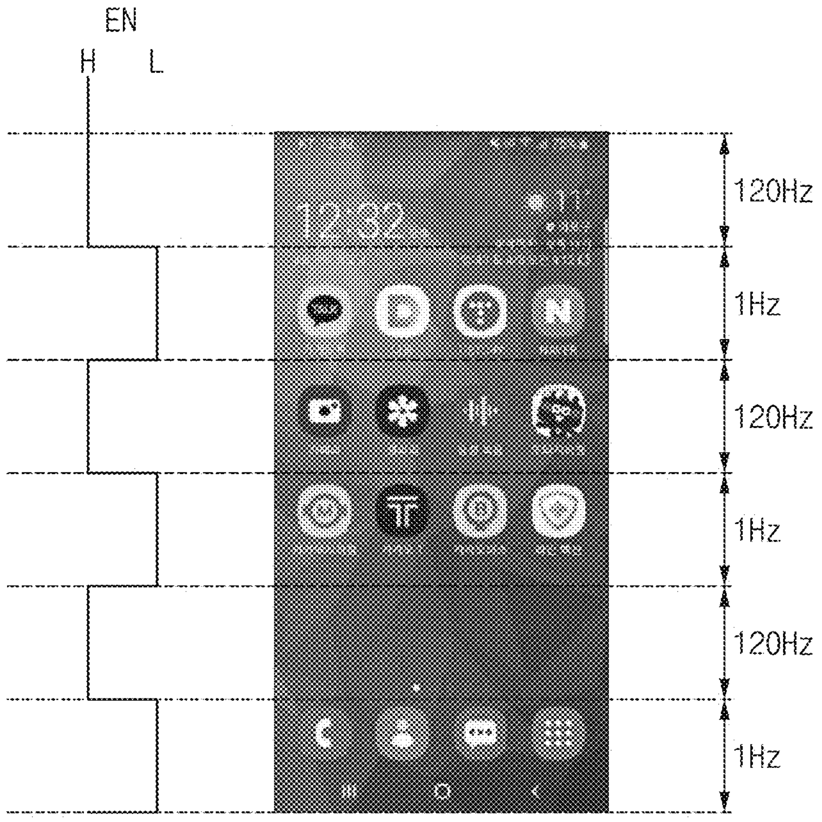
FIG. 5 is a conceptual diagram illustrating an enable signal applied to the gate emission driver of FIG. 1 according to driving frequencies of portions of the display panel of FIG. 1.

FIG. 4 is a conceptual diagram illustrating the gate emission driver 300 of FIG. 1. FIG. 5 is a conceptual diagram illustrating an enable signal EN applied to the gate emission driver 300 of FIG. 1 according to driving frequencies of portions of the display panel 100 of FIG. 1.

Referring to FIGS. 1 to 5, an embodiment of the gate emission driver 300 may include a carry generator ST that generates a carry signal based on a previous carry signal and a gate signal masking circuit MC connected to the carry generator ST.

The gate signal masking circuit MC may output or not output a gate pulse based on the enable signal EN. In an embodiment, for example, the gate signal masking circuit MC may control the output of the gate signal based on the enable signal EN, a signal of a first input node of a first driver, a signal of a second input node of a second driver, a signal of a third input node of the second driver and an output signal of a third driver.

In an embodiment, for example, when the enable signal EN has a high level H, the gate signal masking circuit MC may output the gate pulse.

In an embodiment, for example, when the enable signal EN has a low level L, the gate signal masking circuit MC may not output the gate pulse.

As shown in FIG. 5, an embodiment of the gate emission driver 300 may output the gate pulse at a high frequency (e.g., 120 Hz) for a portion of the display panel 100 where a high frequency driving is necessary, and may output a gate pulse at a low frequency (e.g., 1 Hz) for a portion of the display panel 100 where a low frequency driving is necessary according to the enable signal EN.

The gate signal masking circuit MC may mask an output of the gate pulse to output the gate pulse in the low frequency (e.g., 1 Hz). The carry generator ST transfers the carry signal to a next stage regardless of the operation of the gate signal masking circuit MC for masking the output of the gate pulse such that the gate emission driver 300 may support the multiple division of the driving frequency.

Figure 6:
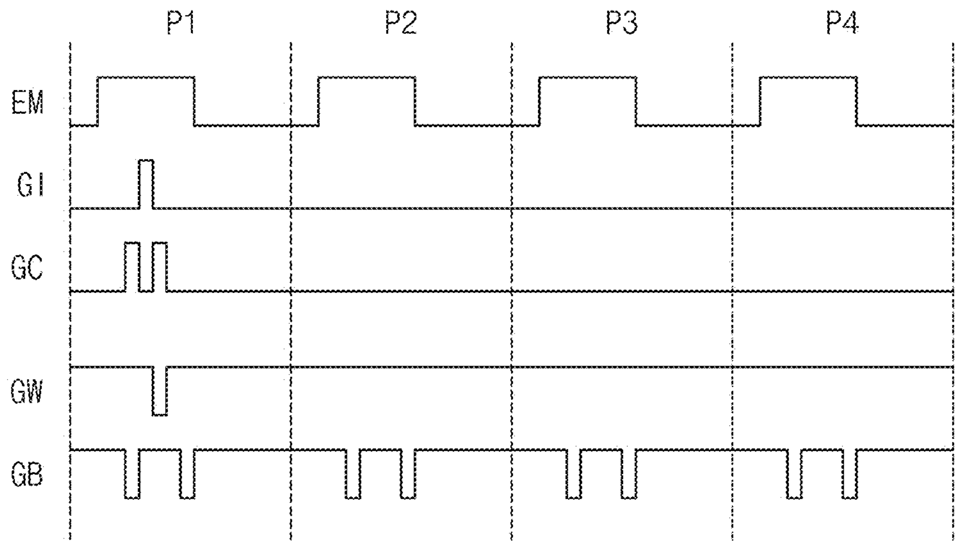
FIG. 6 is a timing diagram illustrating input signals applied to the pixel of FIG. 2 in a data writing period.
Figure 7:
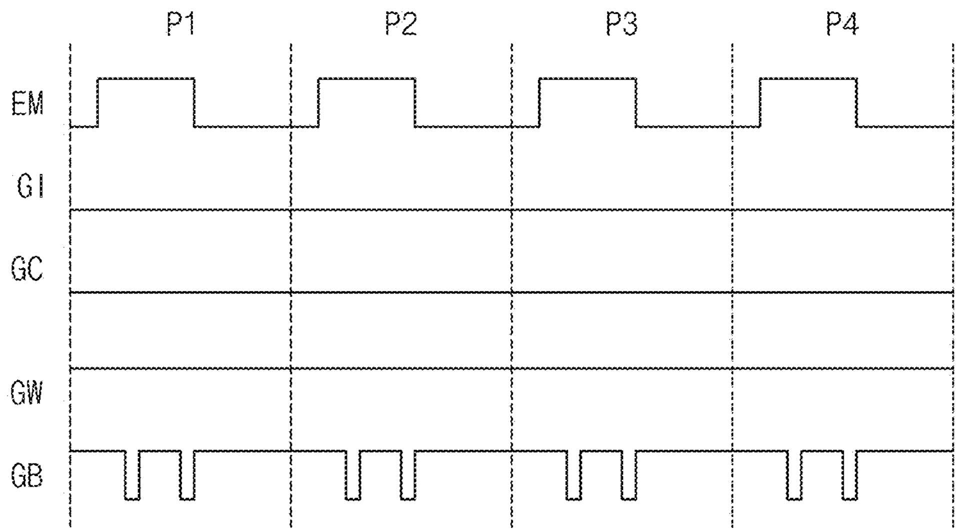
FIG. 7 is a timing diagram illustrating input signals applied to the pixel of FIG. 2 in a holding period.

FIG. 6 is a timing diagram illustrating input signals applied to the pixel of FIG. 2 in a data writing period. FIG. 7 is a timing diagram illustrating input signals applied to the pixel of FIG. 2 in a holding period.

Referring to FIGS. 1 to 7, in a low frequency driving mode, a driving timing of the display panel 100 includes a data writing period, in which the data voltage is written to the pixel and the pixel emits a light, and a holding period, in which the data voltage is not written to the pixel and the pixel emits a light.

The data writing period may include at least one data writing frame. The data writing period may include a data writing frame and a self scan frame. In contrast, the holding period may not include the data writing frame but include only the self scan frame.

In a first frame P1 of FIG. 6 which is the data writing frame, the data initialization gate signal GI, the compensation gate signal GC and the data writing gate signal GW may have active pulses. Second to fourth frames P2 to P4 of FIG. 6 may be the self scan frames.

As shown in the first frame P1 of FIG. 6, for example, the data initialization gate signal GI may output a single pulse in the frame. As shown in the first frame P1 of FIG. 6, for example, the compensation gate signal GC may output two pulses in the frame.

In contrast, in a first frame P1 of FIG. 7 which is the self scan frame, the data initialization gate signal GI, the compensation gate signal GC and the data writing gate signal GW may not have any active pulses. Second to fourth frames P2 to P4 of FIG. 7 may be the self scan frames.

Figure 8:
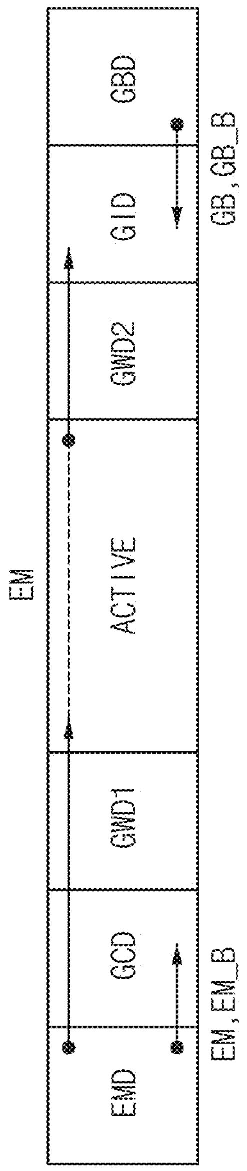
FIG. 8 is a block diagram illustrating an example of the gate emission driver of FIG. 1.

FIG. 8 is a block diagram illustrating an example of the gate emission driver 300 of FIG. 1.

Referring to FIGS. 1 to 8, some drivers of the gate emission driver 300 may be disposed at the first side of the display panel 100 and some other drivers of the gate emission driver 300 may be disposed at the second side of the display panel 100.

For example, an emission driver EMD that generates the emission signal EM, a compensation gate driver GCD that generates the compensation gate signal GC and a first data wring gate driver GWD1 that generates the data wring gate signal GW may be disposed at the first side of the display panel 100.

In an embodiment, for example, a second data wring gate driver GWD2 that generates the data wring gate signal GW, a data initialization gate driver GID that generates the data initialization gate signal GI and a light emitting element initialization gate driver GBD that generates the light emitting element initialization gate signal GB may be disposed at the second side of the display panel 100.

In such an embodiment, the data initialization gate driver GID may receive the emission signal EM from the emission driver EMD, may receive the light emitting element initialization gate signal GB and an inverted signal GB_B of the light emitting element initialization gate signal GB from the light emitting element initialization gate driver GBD and may output the data initialization gate signal GI for supporting the multiple division of the driving frequency.

In such an embodiment, the light emitting element initialization gate driver GBD may be disposed adjacent to the data initialization gate driver GID such that the data initialization gate driver GID may directly receive the light emitting element initialization gate signal GB and the inverted signal GB_B of the light emitting element initialization gate signal GB from the light emitting element initialization gate driver GBD In such an embodiment, the emission driver EMD may be disposed at an opposite side of the data initialization gate driver GID with respect to the display panel 100 such that the data initialization gate driver GID may not directly receive the emission signal EM from the emission driver EMD. In such an embodiment, the data initialization gate driver GID may receive the emission signal EM from an outermost pixel of the display panel 100 in the first direction D1.

Figure 9:
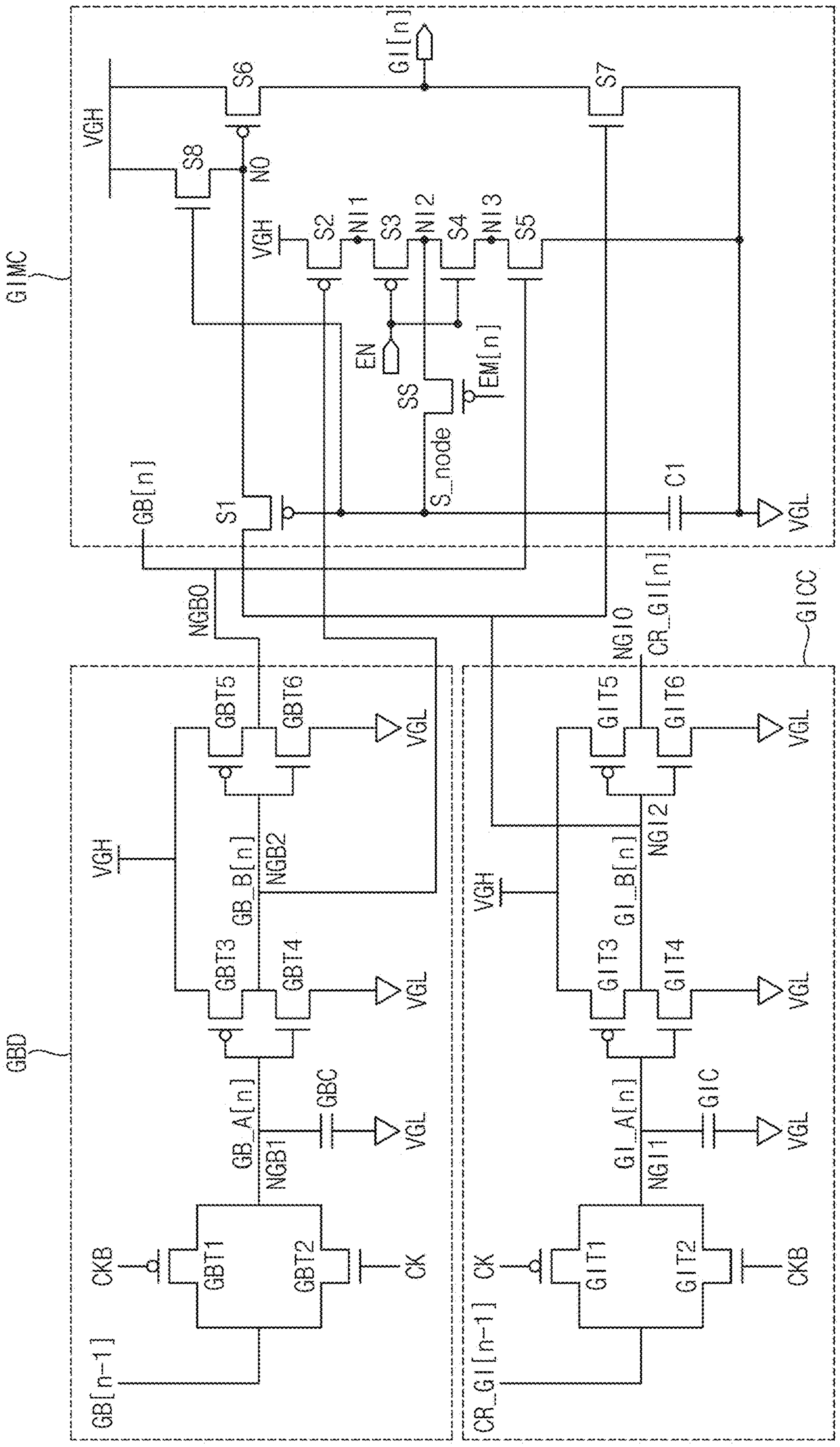
FIG. 9 is a circuit diagram illustrating a first driver, a second driver and a gate signal masking circuit of the gate emission driver of FIG. 1.

FIG. 9 is a circuit diagram illustrating a first driver GICC, a second driver GBD and a gate signal masking circuit GIMC of the gate emission driver 300 of FIG. 1.

Referring to FIGS. 1 to 9, an embodiment of the first driver GICC may be a carry generator that generates a carry signal CR_GI[n] of the data initialization gate signal GI. The first driver GICC may be a complementary metal-oxide semiconductor (CMOS) driver. The first driver GICC may generate a carry signal CR_GI[n] based on a previous carry signal CR_GI[n−1].

The first driver GICC may include a first first gate switching element GIT1, a second first gate switching element GIT2, a third first gate switching element GIT3, a fourth first gate switching element GIT4, a fifth first gate switching element GIT5 and a sixth first gate switching element GIT6.

The first first gate switching element GIT1 may include a control electrode that receives one of a first clock signal CK and a second clock signal CKB, a first electrode that receives the previous carry signal CR_GI[n−1] and a second electrode connected to a first first gate node NGI1. The second first gate switching element GIT2 may include a control electrode that receives the other of the first clock signal CK and the second clock signal CKB, a first electrode that receives the previous carry signal CR_GI[n−1] and a second electrode connected to the first first gate node NGI1. The third first gate switching element GIT3 may include a control electrode connected to the first first gate node NGI1, a first electrode that receives a first power voltage VGH and a second electrode connected to a second first gate node NGI2. The fourth first gate switching element GIT4 may include a control electrode connected to the first first gate node NGI1, a first electrode connected to the second first gate node NGI2 and a second electrode that receives a second power voltage VGL. The fifth first gate switching element GIT5 may include a control electrode connected to the second first gate node NGI2, a first electrode that receives the first power voltage VGH and a second electrode connected to a carry output node NGIO. The sixth first gate switching element GIT6 may include a control electrode connected to the second first gate node NGI2, a first electrode connected to the carry output node NGIO and a second electrode that receives the second power voltage VGL.

In such an embodiment, the first power voltage VGH and the second power voltage VGL may be power voltages of the gate emission driver 300. In an embodiment, for example, the first power voltage VGH may be greater than the second power voltage VGL.

When the first clock signal CK is applied to the control electrode of the first first gate switching element GIT1, the second clock signal CKB may be applied to the control electrode of the second first gate switching element GIT2. In contrast, when the second clock signal CKB is applied to the control electrode of the first first gate switching element GIT1, the first clock signal CK may be applied to the control electrode of the second first gate switching element GIT2.

The first driver GICC may further include a gate capacitor GIC including a first electrode connected to the first first gate node NGI1 and a second electrode that receives the second power voltage VGL.

The first first gate switching element GIT1, the third first gate switching element GIT3 and the fifth first gate switching element GIT5 may be P-type transistors. The second first gate switching element GIT2, the fourth first gate switching element GIT4 and the sixth first gate switching element GIT6 may be N-type transistors.

The first first gate switching element GIT1 and the second first gate switching element GIT2 may be synchronized with the first clock signal CK and the second clock signal CKB and may transmit the previous carry signal CR_GI[n−1] to the first first gate node NGI1.

The third first gate switching element GIT3 and the fourth first gate switching element GIT4 may invert the signal GI_A[n] of the first first gate node NGI1 and may transmit the inverted signal to the second first gate node NGI2.

The fifth first gate switching element GIT5 and the sixth first gate switching element GIT6 may invert the signal GI_B[n] of the second first gate node NGI2 and may output the inverted signal to the carry output node NGIO.

The carry output node NGIO may output the carry signal CR_GI[n].

The second driver GBD may be a light emitting element initialization gate driver that generates the light emitting element initialization gate signal GB. The second driver GBD may be a CMOS driver. The second driver GBD may generate the light emitting element initialization gate signal GB[n] based on a previous light emitting element initialization gate signal GB[n−1].

The second driver GBD may include a first second gate switching element GBT1, a second second gate switching element GBT2, a third second gate switching element GBT3, a fourth second gate switching element GBT4, a fifth second gate switching element GBT5 and a sixth second gate switching element GBT6.

The first second gate switching element GBT1 may include a control electrode that receives one of the first clock signal CK and the second clock signal CKB, a first electrode that receives the previous light emitting element initialization gate signal GB[n−1] and a second electrode connected to a first second gate node NGB1. The second second gate switching element GBT2 may include a control electrode that receives the other of the first clock signal CK and the second clock signal CKB, a first electrode that receives the previous light emitting element initialization gate signal GB[n−1] and a second electrode connected to the first second gate node NGB1. The third second gate switching element GBT3 may include a control electrode connected to the first second gate node NGB1, a first electrode that receives the first power voltage VGH and a second electrode connected to a second second gate node NGB2. The fourth second gate switching element GBT4 may include a control electrode connected to the first second gate node NGB1, a first electrode connected to the second second gate node NGB2 and a second electrode that receives the second power voltage VGL. The fifth second gate switching element GBT5 may include a control electrode connected to the second second gate node NGB2, a first electrode that receives the first power voltage VGH and a second electrode connected to a second gate output node NGBO. The sixth second gate switching element GBT6 may include a control electrode connected to the second second gate node NGB2, a first electrode connected to the second gate output node NGBO and a second electrode that receives the second power voltage VGL.

When the first clock signal CK is applied to the control electrode of the first second gate switching element GBT1, the second clock signal CKB may be applied to the control electrode of the second second gate switching element GBT2. In contrast, when the second clock signal CKB is applied to the control electrode of the first second gate switching element GBT1, the first clock signal CK may be applied to the control electrode of the second second gate switching element GBT2.

The second driver GBD may further include a second gate capacitor GBC including a first electrode connected to the first second gate node NGB1 and a second electrode that receives the second power voltage VGL.

The first second gate switching element GBT1, the third second gate switching element GBT3 and the fifth second gate switching element GBT5 may be P-type transistors. The second second gate switching element GBT2, the fourth second gate switching element GBT4 and the sixth second gate switching element GBT6 may be N-type transistors.

The first second gate switching element GBT1 and the second second gate switching element GBT2 may be synchronized with the first clock signal CK and the second clock signal CKB and may transmit the previous light emitting element initialization gate signal GB[n−1] to the first second gate node NGB1.

The third second gate switching element GBT3 and the fourth second gate switching element GBT4 may invert the signal GB_A[n] of the first second gate node NGB1 and may transmit the inverted signal to the second second gate node NGB2.

The fifth second gate switching element GBT5 and the sixth second gate switching element GBT6 may invert the signal GB_B[n] of the second second gate node NGB2 and may output the inverted signal to the second gate output node NGBO.

The second gate output node NGBO may output the light emitting element initialization gate signal GB[n].

The third driver EMD may be an emission driver that generates the emission signal EM. The third driver EMD may be a CMOS driver. The third driver EMD may generate an emission signal EM[n] based on a previous emission signal EM[n−1].

The gate signal masking circuit GIMC may control an output of the gate signal GI[n] based on the enable signal EN, the signal GI_B[n] of the first input node NGI2 of the first driver GICC, the signal GB_B[n] of the second input node NGB2 of the second driver GBD, the signal GB[n] of the second gate output node NGBO of the second driver GBD and the output signal EM[n] of the third driver EMD.

In an embodiment, for example, a first input node of the first driver GICC may be the second first gate node NGI2. In an embodiment, for example, a second input node of the second driver GBD may be the second second gate node NGB2. In an embodiment, for example, a third input node of the second driver GBD may be the second gate output node NGBO.

The gate signal masking circuit GIMC may include a first switching element S1, a second switching element S2, a third switching element S3, a fourth switching element S4, a fifth switching element S5 and a floating switching element SS.

The first switching element S1 may include a control electrode connected to a masking control node S_node, a first electrode connected to the first input node NGI2 and a second electrode connected to an output control node NO. The second switching element S2 may include a control electrode connected to the second input node NGB2, a first electrode that receives the first power voltage VGH and a second electrode connected to a first intermediate node NI1. The third switching element S3 may include a control electrode that receives the enable signal EN, a first electrode connected to the first intermediate node NI1 and a second electrode connected to a second intermediate node NI2. The fourth switching element S4 may include a control electrode that receives the enable signal EN, a first electrode connected to the second intermediate node NI2 and a second electrode connected to a third intermediate node NI3. The fifth switching element S5 may include a control electrode connected to the third input node NGBO, a first electrode connected to the third intermediate node NI3 and a second electrode that receives the second power voltage VGL. The floating switching element SS may include a control electrode that receives a floating control signal, a first electrode connected to the masking control node S_node and a second electrode connected to the third intermediate node NI3. In such an embodiment, the floating control signal may be the emission signal EM[n].

In such an embodiment, the second switching element S2 and the third switching element S3 are P-type transistors, and the fourth switching element S4 and the fifth switching element S5 are N-type transistors.

In an embodiment, for example, the first switching element S1 may be a P-type transistor. In an embodiment, for example, the floating switching element SS may be a P-type transistor.

The gate signal masking circuit GIMC may further include a sixth switching element S6 including a control electrode connected to the output control node NO, a first electrode that receives the first power voltage VGH and a second electrode connected to a gate output node that outputs the gate signal GI[n], and a seventh switching element S7 including a control electrode connected to the first input node NGI2, a first electrode connected to the gate output node and a second electrode that receives the second power voltage VGL.

The gate signal masking circuit GIMC may further include an eighth switching element S8 including a control electrode connected to the masking control node S_node, a first electrode that receives the first power voltage VGH and a second electrode connected to the output control node NO.

In such an embodiment, the sixth switching element S6 may be a P-type transistor, the seventh switching element S7 may be an N-type transistor, and the eighth switching element S8 may be an N-type transistor.

The gate signal masking circuit GIMC may further include a first capacitor C1 including a first electrode connected to the masking control node S_node and a second electrode that receives the second power voltage VGL.

The signal GB_B[n] of the second input node NGB2 may be an inverted signal of the signal GB[n] of the third input node NGBO.

When the signal of the masking control node S_node has a low level, the first switching element S1 is turned on such that the first input node NGI2 is connected to the output control node NO. When the signal of the masking control node S_node has the low level, the sixth switching element S6 and the seventh switching element S7 invert the signal GI_B[n] of the first input node NGI2 and output the inverted signal as the gate signal GI[n].

When the signal of the masking control node S_node has the low level, the sixth switching element S6 and the seventh switching element S7 operate similarly to the fifth first gate switching element GIT5 and the sixth first gate switching element GIT6 such that the gate signal GI[n] having a same waveform of the carry signal CR_GI[n] is output to the pixel.

In contrast, when the signal of the masking control node S_node has a high level, the first switching element S1 is turned off. In addition, when the signal of the masking control node S_node has the high level, the eight switching element S8 is turned on such that the first power voltage VGH having a high level is applied to the output control node NO.

When the first power voltage VGH having the high level is applied to the output control node NO, the sixth switching element S6 is turned off such that a high level of the gate signal GI[n] is not generated.

FIG. 10 is a table illustrating a status of a signal of the masking control node S_node according to an input signal of the gate signal masking circuit GIMC of FIG. 9. FIG. 11 is a table illustrating a status of a switching element S2, S3, S4, S5 and SS of the gate signal masking circuit GIMC of FIG. 9 and an operation of the gate signal masking circuit GIMC of FIG. 9 according to an input signal of the gate signal masking circuit of FIG. 9.

As shown in FIG. 10, the status of the signal of the masking control node S_node according to the input signals EN, GB_B[n], GB[n] and EM[n] of the gate signal masking circuit GIMC may be represented in a table.

Referring to FIG. 10, when the enable signal EN has a high level, the signal GB_N[n] of the second input node has a high level and the floating control signal EM[n] has a low level, the signal of the masking control node S_node may maintain a previous status. This condition may be defined as a first condition CN1.

When the enable signal EN has the high level, the signal GB_B[n] of the second input node has a low level and the floating control signal EM[n] has the low level, the signal of the masking control node S_node may have a low level. This condition may be defined as a second condition CN2.

When the enable signal EN has a low level, the signal GB_B[n] of the second input node has the high level and the floating control signal EM[n] has the low level, the signal of the masking control node S_node may maintain a previous status. This condition may be defined as a third condition CN3.

When the enable signal EN has the low level, the signal GB_B[n] of the second input node has the low level and the floating control signal EM[n] has the low level, the signal of the masking control node S_node may have a high level. This condition may be defined as a fourth condition CN4.

When the floating control signal EM[n] has a high level, the floating switching element SS is turned off such that the signal of the masking control node S_node may maintain a previous status regardless of the status of the enable signal EN and the status of the signal GB_B[n] of the second input node. This condition may be defined as a fifth condition CN5.

Referring to FIG. 11, in the first condition CN1, the enable signal EN has the high level such that the third switching element S3 may be turned off and the fourth switching element S4 may be turned on. In the first condition CN1, the signal GB_B[n] of the second input node has the high level and the signal GB[n] of the third input node has the low level such that the second switching element S2 and the fifth switching element S5 may be turned off. As described above, in the first condition CN1, only the fourth switching element S4 is turned on among the second to fifth switching elements S2 to S5 such that the masking control node S_node may have a floating status and may maintain a previous status.

In the second condition CN2, the enable signal EN has the high level so that the third switching element S3 may be turned off and the fourth switching element S4 may be turned on. In the second condition CN2, the signal GB_B[n] of the second input node has the low level and the signal GB[n] of the third input node has the high level such that the second switching element S2 and the fifth switching element S5 may be turned on. In the second condition CN2, the floating control signal EM[n] has the low level such that the floating switching element SS may be turned on. As described above, in the second condition CN2, the second, fourth and fifth switching elements S2, S4 and S5 are turned on among the second to fifth switching elements S2 to S5 such that the second power voltage VGL having the low level may be applied to the masking control node S_node through the fifth switching element S5, the fourth switching element S4 and the floating switching element SS. In the second condition CN2, the second power voltage VGL having the low level is applied to the masking control node S_node, the first switching element S1 is turned on such that the gate signal masking circuit GIMC may normally output the gate signal GI[n].

In the third condition CN3, the enable signal EN has the low level so that the third switching element S3 may be turned on and the fourth switching element S4 may be turned off. In the third condition CN3, the signal GB_B[n] of the second input node has the high level and the signal GB[n] of the third input node has the low level such that the second switching element S2 and the fifth switching element S5 may be turned off. As described above, in the third condition CN3, only the third switching element S3 is turned on among the second to fifth switching elements S2 to S5 such that the masking control node S_node may have a floating status and may maintain a previous status.

In the fourth condition CN4, the enable signal EN has the low level so that the third switching element S3 may be turned on and the fourth switching element S4 may be turned off. In the fourth condition CN4, the signal GB_B[n] of the second input node has the low level and the signal GB[n] of the third input node has the high level such that the second switching element S2 and the fifth switching element S5 may be turned on. In the fourth condition CN4, the floating control signal EM[n] has the low level such that the floating switching element SS may be turned on. As described above, in the fourth condition CN4, the second, third and fifth switching elements S2, S3 and S5 are turned on among the second to fifth switching elements S2 to S5 such that the first power voltage VGH having the high level may be applied to the masking control node S_node through the second switching element S2, the third switching element S3 and the floating switching element SS. In the fourth condition CN4, the first power voltage VGH having the high level is applied to the masking control node S_node, the first switching element S1 is turned off such that the gate signal masking circuit GIMC may block the output of the gate signal GI[n].

In the fifth condition CN5, the floating control signal EM[n] has the high level such that the floating switching element SS may be turned off. In the fifth condition CN5, when the floating switching element SS is turned off, the signal of the third intermediate node NI3 determined by turn-on and turn-off of the second to fifth switching elements S2 to S5 is not transmitted to the masking control node S_node. Thus, in the fifth condition CN5, the masking control node S_node may have a floating status regardless of the status of the enable signal EN, the status of the signal GB_B[n] of the second input node and the status of the signal GB[n] of the third input node and may maintain a previous status.

Figure 12:
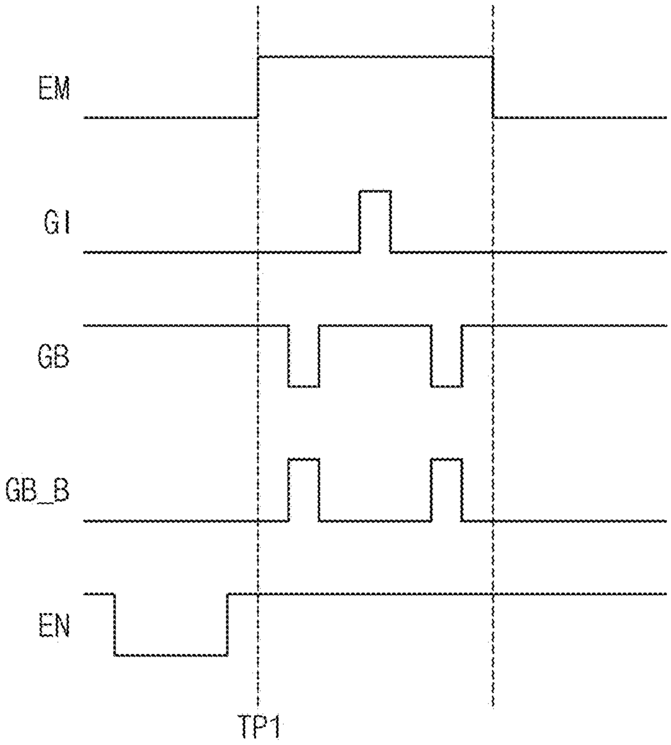
FIG. 12 is a timing diagram illustrating an output of the first gate signal when a low pulse of the enable signal is at a first time position.
Figure 13:
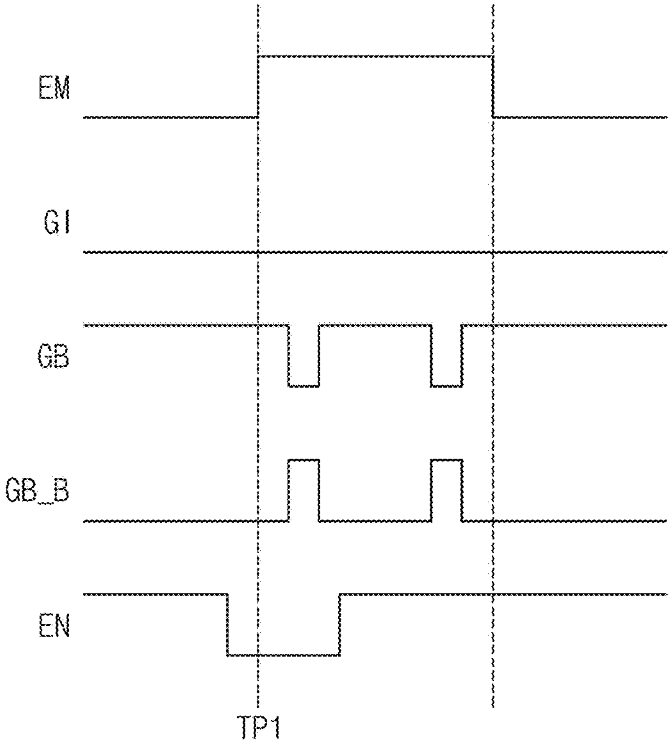
FIG. 13 is a timing diagram illustrating the output of the first gate signal when the low pulse of the enable signal is at a second time position.
Figure 14:
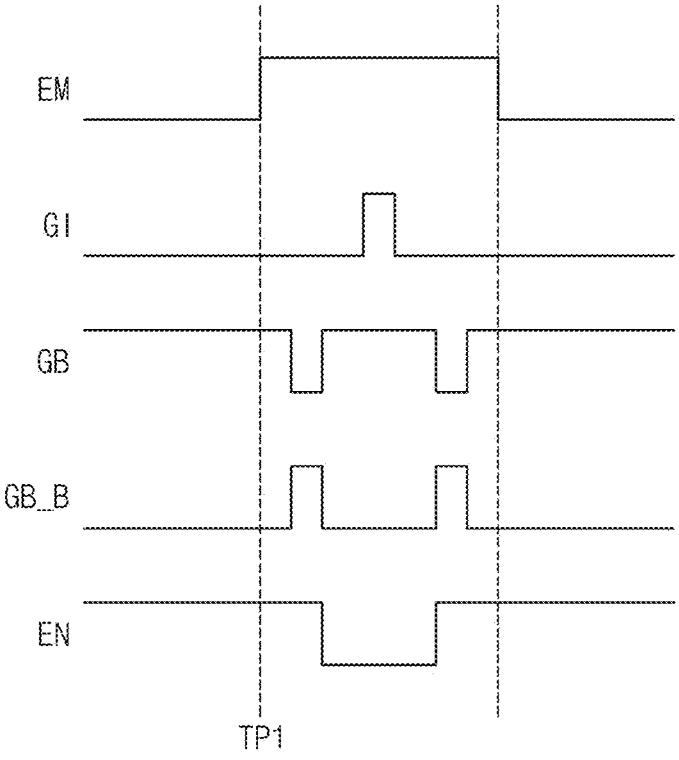
FIG. 14 is a timing diagram illustrating the output of the first gate signal when the low pulse of the enable signal is at a third time position.

FIG. 12 is a timing diagram illustrating an output of the first gate signal GI when a low pulse of the enable signal EN is at a first time position. FIG. 13 is a timing diagram illustrating the output of the first gate signal GI when the low pulse of the enable signal EN is at a second time position. FIG. 14 is a timing diagram illustrating the output of the first gate signal GI when the low pulse of the enable signal EN is at a third time position.

Referring to FIG. 12, at a time point immediately prior to a rising edge TP1 at which the floating control signal EM[n] rises from a low level to a high level, the enable signal EN has a high level, the signal GB_B[n] of the second input node has a low level and the floating control signal EM[n] has a low level. At the time point immediately prior to the rising edge TP1 of the floating control signal EM[n] of FIG.

12, the gate signal masking circuit GIMC may be in the second condition CN2 of FIG. 10 such that the signal of the masking control node S_node may have a low level.

After the rising edge TP1 of the floating control signal EM[n] of FIG. 12, the floating control signal EM[n] has a high level and the gate signal masking circuit GIMC may be in the fifth condition CN5 of FIG. 10.

As such, when the signal of the masking control node S_node has the low level at the time point immediately prior to the rising edge TP1 of the floating control signal EM[n] of FIG. 12, the first gate signal GI may be normally outputted.

Referring to FIG. 13, at the time point immediately prior to the rising edge TP1 at which the floating control signal EM[n] rises from a low level to a high level, the enable signal EN has a low level, the signal GB_B[n] of the second input node has the low level and the floating control signal EM[n] has the low level. At the time point immediately prior to the rising edge TP1 of the floating control signal EM[n] of FIG. 13, the gate signal masking circuit GIMC may be in the fourth condition CN4 of FIG. 10 such that the signal of the masking control node S_node may have a high level.

After the rising edge TP1 of the floating control signal EM[n] of FIG. 13, the floating control signal EM[n] has the high level and the gate signal masking circuit GIMC may be in the fifth condition CN5 of FIG. 10.

As such, when the signal of the masking control node S_node has the high level at the time point immediately prior to the rising edge TP1 of the floating control signal EM[n] of FIG. 13, the output of the first gate signal GI may be blocked.

Referring to FIG. 14, at a time point immediately prior to the rising edge TP1 at which the floating control signal EM[n] rises from a low level to a high level, the enable signal EN has a high level, the signal GB_B[n] of the second input node has a low level and the floating control signal EM[n] has a low level. At the time point immediately prior to the rising edge TP1 of the floating control signal EM[n] of FIG. 14, the gate signal masking circuit GIMC may be in the second condition CN2 of FIG. 10 such that the signal of the masking control node S_node may have a low level.

After the rising edge TP1 of the floating control signal EM[n] of FIG. 14, the floating control signal EM[n] has a high level and the gate signal masking circuit GIMC may be in the fifth condition CN5 of FIG. 10.

As such, when the signal of the masking control node S_node has the low level at the time point immediately prior to the rising edge TP1 of the floating control signal EM[n] of FIG. 12, the first gate signal GI may be normally outputted.

According to an embodiment, as described herein, the output of the first gate signal GI[n] may be controlled based on the enable signal EN, the signal of the first input node NGI2 of the first driver GICC and the signal of the second input node NGB2 of the second driver GBD, the signal of the second gate output node NGBO of the second driver GBD and the output signal (e.g. the emission signal EM[n]) of the third driver EMD such that the multiple division of the driving frequency may be supported or effectively preformed.

In such an embodiment, the power consumption of the display apparatus may be effectively reduced through the multiple division of the driving frequency. In such an embodiment, the multiple division of the driving frequency of the gate signal (e.g. GC[n]) having two or more pulses may be supported.

In such an embodiment, a circuit of the gate emission driver 300 is disposed at a first side of the display panel 100 and another circuit of the gate emission driver 300 is disposed at a second side of the display panel 100 such that the dead space of the display apparatus may be reduced.

Figure 15:
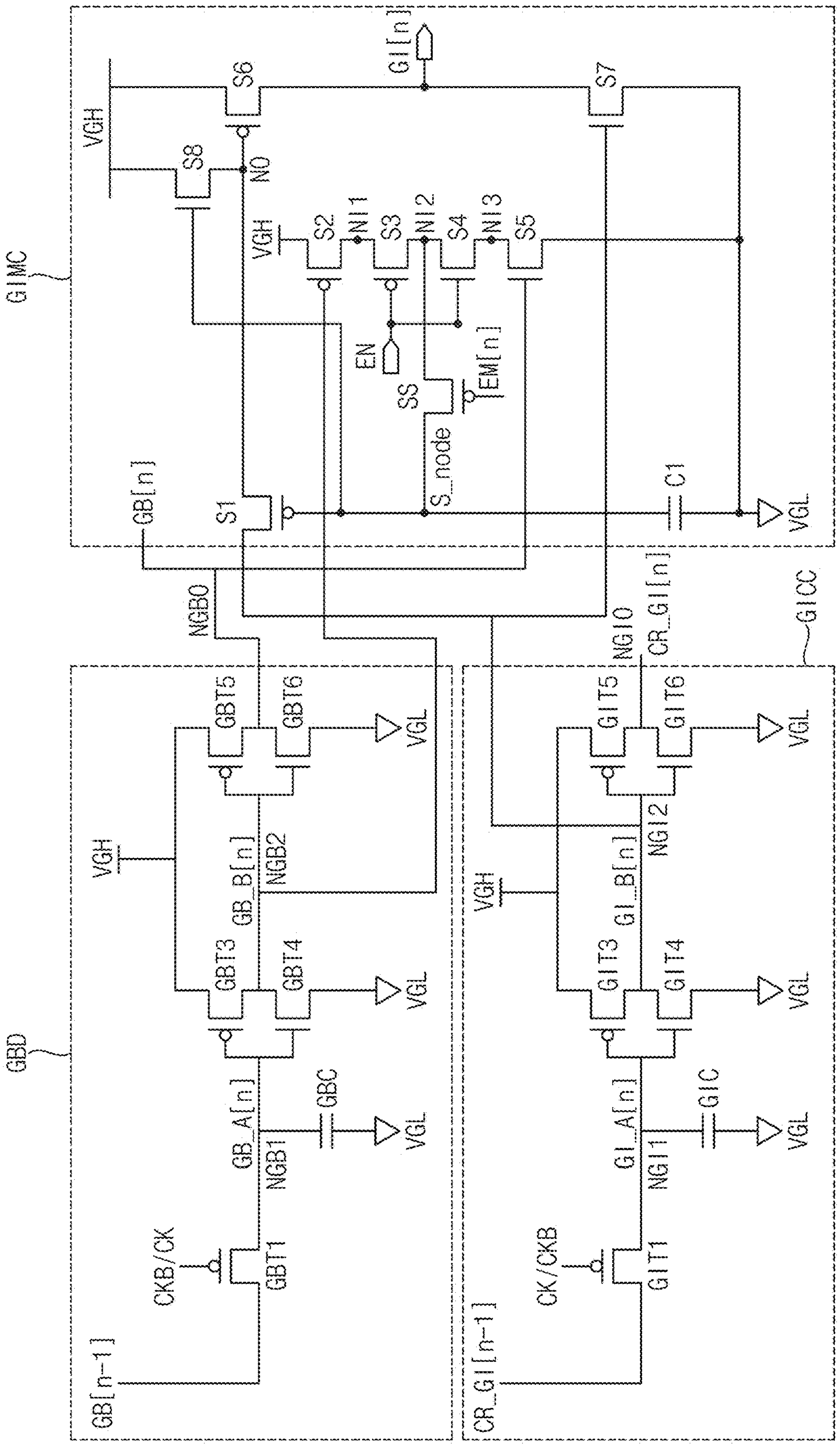
FIG. 15 is a circuit diagram illustrating a first driver, a second driver and a gate signal masking circuit of a gate emission driver according to an embodiment of the invention.

FIG. 15 is a circuit diagram illustrating a first driver GICC, a second driver GBD and a gate signal masking circuit GIMC of a gate emission driver 300 according to an embodiment of the invention.

The gate signal masking circuit, the gate emission driver and the display apparatus according to the embodiment shown in FIG. 15 are substantially the same as the gate signal masking circuit, the gate emission driver and the display apparatus according to the embodiment described above referring to FIGS. 1 to 14 except that the first driver does not include a second first gate switching element and the second driver does not include a second second gate switching element. Thus, the same reference numerals will be used to refer to the same or like parts as those described above with reference to FIGS. 1 to 14 and any repetitive detailed description thereof will be omitted or simplified.

Referring to FIGS. 1 to 8 and 10 to 15, in an embodiment, the first driver GICC may be a carry generator that generates a carry signal CR_GI[n] of the data initialization gate signal GI. The first driver GICC may be a CMOS driver. The first driver GICC may generate a carry signal CR_GI[n] based on a previous carry signal CR_GI[n−1].

The first driver GICC may include a first first gate switching element GIT1, a third first gate switching element GIT3, a fourth first gate switching element GIT4, a fifth first gate switching element GIT5 and a sixth first gate switching element GIT6.

The first first gate switching element GIT1 may include a control electrode that receives one of a first clock signal CK and a second clock signal CKB, a first electrode that receives the previous carry signal CR_GI[n−1] and a second electrode connected to a first first gate node NGI1. The third first gate switching element GIT3 may include a control electrode connected to the first first gate node NGI1, a first electrode that receives a first power voltage VGH and a second electrode connected to a second first gate node NGI2. The fourth first gate switching element GIT4 may include a control electrode connected to the first first gate node NGI1, a first electrode connected to the second first gate node NGI2 and a second electrode that receives a second power voltage VGL. The fifth first gate switching element GIT5 may include a control electrode connected to the second first gate node NGI2, a first electrode that receives the first power voltage VGH and a second electrode connected to a carry output node NGIO. The sixth first gate switching element GIT6 may include a control electrode connected to the second first gate node NGI2, a first electrode connected to the carry output node NGIO and a second electrode that receives the second power voltage VGL.

The first driver GICC may further include a first gate capacitor GIC including a first electrode connected to the first first gate node NGI1 and a second electrode that receives the second power voltage VGL.

The first first gate switching element GIT1, the third first gate switching element GIT3 and the fifth first gate switching element GIT5 may be P-type transistors. The fourth first gate switching element GIT4 and the sixth first gate switching element GIT6 may be N-type transistors.

The first first gate switching element GIT1 may be synchronized with one of the first clock signal CK and the second clock signal CKB and may transmit the previous carry signal CR_GI[n−1] to the first first gate node NGI1.

The second driver GBD may be a light emitting element initialization gate driver that generates the light emitting element initialization gate signal GB. The second driver GBD may be a CMOS driver. The second driver GBD may generate light emitting element initialization gate signal GB[n] based on a previous light emitting element initialization gate signal GB[n−1].

The second driver GBD may include a first second gate switching element GBT1, a third second gate switching element GBT3, a fourth second gate switching element GBT4, a fifth second gate switching element GBT5 and a sixth second gate switching element GBT6.

The first gate switching element GBT1 may include a control electrode that receives one of the first clock signal CK and the second clock signal CKB, a first electrode that receives the light emitting element initialization gate signal GB[n−1] and a second electrode connected to a first second gate node NGB1. The third second gate switching element GBT3 may include a control electrode connected to the first second gate node NGB1, a first electrode that receives the first power voltage VGH and a second electrode connected to a second second gate node NGB2. The fourth second gate switching element GBT4 may include a control electrode connected to the first second gate node NGB1, a first electrode connected to the second second gate node NGB2 and a second electrode that receives the second power voltage VGL. The fifth second gate switching element GBT5 may include a control electrode connected to the second second gate node NGB2, a first electrode that receives the first power voltage VGH and a second electrode connected to a second gate output node NGBO. The sixth second gate switching element GBT6 may include a control electrode connected to the second second gate node NGB2, a first electrode connected to the second gate output node NGBO and a second electrode that receives the second power voltage VGL.

The second driver GBD may further include a second gate capacitor GBC including a first electrode connected to the first second gate node NGB1 and a second electrode that receives the second power voltage VGL.

The first second gate switching element GBT1, the third second gate switching element GBT3 and the fifth second gate switching element GBT5 may be P-type transistors. The fourth second gate switching element GBT4 and the sixth second gate switching element GBT6 may be N-type transistors.

The first second gate switching element GBT1 may be synchronized with one of the first clock signal CK and the second clock signal CKB and may transmit the previous light emitting element initialization gate signal GB[n−1] to the first second gate node NGB1.

The gate signal masking circuit GIMC may control the output of the gate signal GI[n] based on the enable signal EN, the signal GI_B[n] of the first input node NGI2 of the first driver GICC, the signal GB_B[n] of the second input node NGB2 of the second driver GBD, the signal GB[n] of the second gate output node NGBO of the second driver GBD and the output signal EM[n] of the third driver EMD.

In an embodiment, for example, the first input node of the first driver GICC may be the second first gate node NGI2. In an embodiment, for example, the second input node of the second driver GBD may be the second second gate node NGB2 and the third input node of the second driver GBD may be the second gate output node NGBO.

According to an embodiment, as described above, the output of the first gate signal GI[n] may be controlled based on the enable signal EN, the signal of the first input node NGI2 of the first driver GICC and the signal of the second input node NGB2 of the second driver GBD, the signal of the second gate output node NGBO of the second driver GBD and the output signal (e.g. the emission signal EM[n]) of the third driver EMD so that the multiple division of the driving frequency may be supported.

In such an embodiment, the power consumption of the display apparatus may be effectively reduced through the multiple division of the driving frequency. In such an embodiment, the multiple division of the driving frequency of the gate signal (e.g. GC[n]) having two or more pulses may be supported or effectively performed.

In such an embodiment, a circuit of the gate emission driver 300 is disposed at a first side of the display panel 100 and another circuit of the gate emission driver 300 is disposed at a second side of the display panel 100 such that the dead space of the display apparatus may be reduced.

Figure 16:
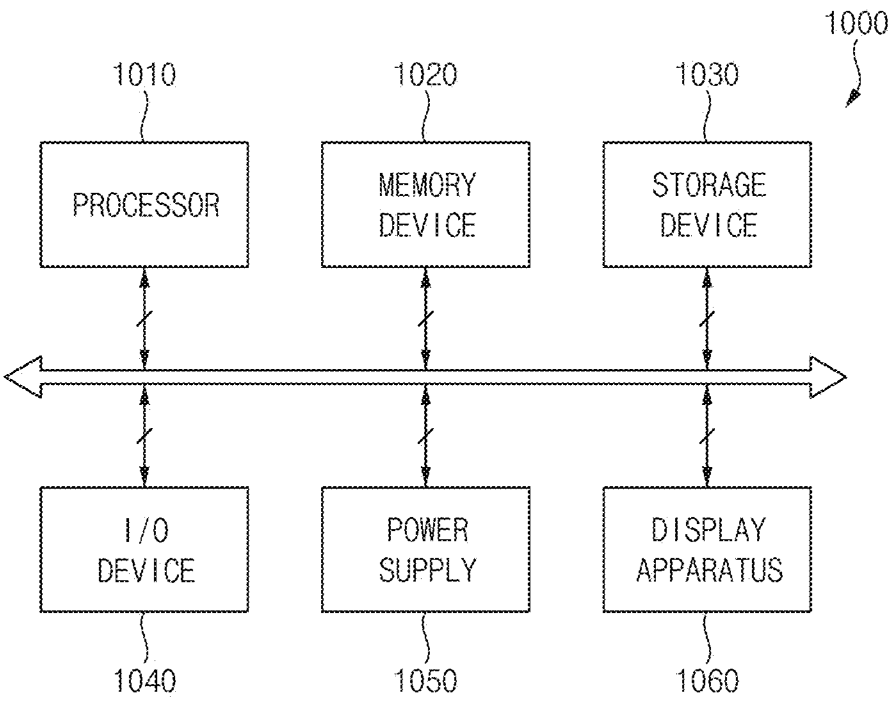
FIG. 16 is a block diagram illustrating an electronic apparatus according to an embodiment of the invention.
Figure 17:
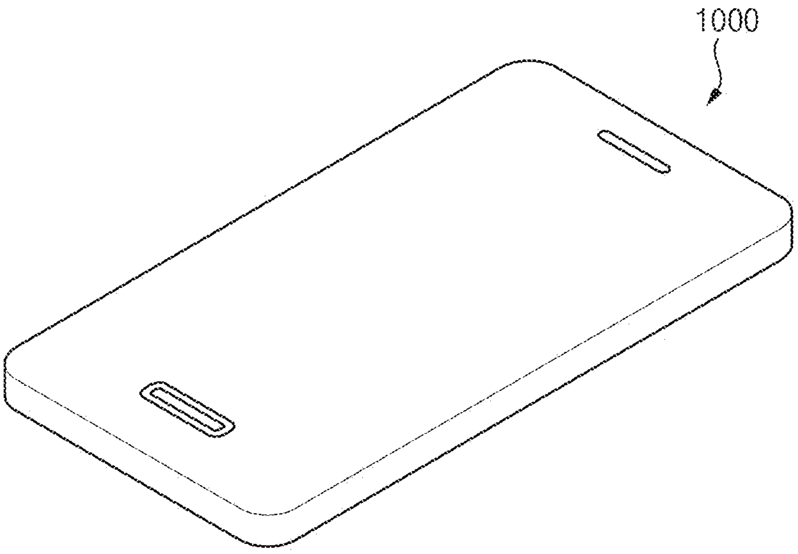
FIG. 17 is a diagram illustrating an example in which the electronic apparatus of FIG. 16 is implemented as a smart phone.

FIG. 16 is a block diagram illustrating an electronic apparatus according to an embodiment of the invention. FIG. 17 is a diagram illustrating an example in which the electronic apparatus of FIG. 16 is implemented as a smart phone.

Referring to FIGS. 16 and 17, an embodiment of the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 17, the electronic apparatus 1000 may be implemented as a smart phone. However, the electronic apparatus 1000 is not limited thereto. In an embodiment, for example, the electronic apparatus 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the embodiments of the gate signal masking circuit, the gate emission driver and the display apparatus, the power consumption of the display apparatus may be reduced and the dead space of the display apparatus may be reduced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A gate signal masking circuit comprising:

a first switching element including a control electrode connected to a masking control node, a first electrode connected to a first input node and a second electrode connected to an output control node;

a second switching element including a control electrode connected to a second input node, a first electrode which receives a first power voltage and a second electrode connected to a first intermediate node;

a third switching element including a control electrode which receives an enable signal, a first electrode connected to the first intermediate node and a second electrode connected to a second intermediate node;

a fourth switching element including a control electrode which receives the enable signal, a first electrode connected to the second intermediate node and a second electrode connected to a third intermediate node;

a fifth switching element including a control electrode connected to a third input node, a first electrode connected to the third intermediate node and a second electrode which receives a second power voltage; and a floating switching element including a control electrode which receives a floating control signal, a first electrode connected to the masking control node and a second electrode connected to the third intermediate node, wherein the second switching element and the third switching element are P-type transistors, and wherein the fourth switching element and the fifth switching element are N-type transistors.

2. The gate signal masking circuit of claim 1, further comprising:

a sixth switching element including a control electrode connected to the output control node, a first electrode which receives the first power voltage and a second electrode connected to a gate output node; and a seventh switching element including a control electrode connected to the first input node, a first electrode connected to the gate output node and a second electrode which receives the second power voltage.

3. The gate signal masking circuit of claim 2, further comprising:

an eighth switching element including a control electrode connected to the masking control node, a first electrode which receives the first power voltage and a second electrode connected to the output control node.

4. The gate signal masking circuit of claim 2, further comprising:

a first capacitor including a first electrode connected to the masking control node and a second electrode which receives the second power voltage.

5. The gate signal masking circuit of claim 1, wherein the floating control signal is an emission signal.

6. The gate signal masking circuit of claim 1, wherein when the floating control signal has a high level, a signal of the masking control node maintains a previous status.

7. The gate signal masking circuit of claim 1, wherein a signal of the third input node is an inverted signal of a signal of the second input node.

8. The gate signal masking circuit of claim 1, wherein when the enable signal has a high level, a signal of the second input node has a high level and the floating control signal has a low level, a signal of the masking control node is configured to maintains a previous status.

9. The gate signal masking circuit of claim 1, wherein when the enable signal has a high level, a signal of the second input node has a low level and the floating control signal has a low level, a signal of the masking control node has a low level.

10. The gate signal masking circuit of claim 1, wherein when the enable signal has a low level, a signal of the second input node has a high level and the floating control signal has a low level, a signal of the masking control node maintains a previous status.

11. The gate signal masking circuit of claim 1, wherein when the enable signal has a low level, a signal of the second input node has a low level and the floating control signal has a low level, a signal of the masking control node has a high level.

12. A gate emission driver comprising:

a first driver which generates a carry signal of a first gate signal based on a previous carry signal of the first gate signal;

a second driver which generates a second gate signal based on a previous second gate signal;

a third driver which generates an emission signal based on a previous emission signal; and a gate signal masking circuit which controls an output of the first gate signal based on an enable signal, based on a signal of a first input node thereof connected to a gate node of the first driver, based on a signal of a second input node thereof connected to a gate node of the second driver, based on a signal of a third input node thereof connected to an output node of the second driver, and based on the emission signal.

13. The gate emission driver of claim 12, wherein the gate signal masking circuit comprises:

a first switching element including a control electrode connected to a masking control node, a first electrode connected to the first input node and a second electrode connected to an output control node;

a second switching element including a control electrode connected to the second input node, a first electrode which receives a first power voltage and a second electrode connected to a first intermediate node;

a third switching element including a control electrode which receives the enable signal, a first electrode connected to the first intermediate node and a second electrode connected to a second intermediate node;

a fourth switching element including a control electrode which receives the enable signal, a first electrode connected to the second intermediate node and a second electrode connected to a third intermediate node, and a fifth switching element including a control electrode connected to the third input node, a first electrode connected to the third intermediate node and a second electrode which receives a second power voltage; and a floating switching element including a control electrode which receives the emission signal, a first electrode connected to the masking control node and a second electrode connected to the third intermediate node, wherein the second switching element and the third switching element are P-type transistors, and wherein the fourth switching element and the fifth switching element are N-type transistors.

14. The gate emission driver of claim 13, wherein the gate signal masking circuit further comprises:

a sixth switching element including a control electrode connected to the output control node, a first electrode which receives the first power voltage and a second electrode connected to a gate output node;

a seventh switching element including a control electrode connected to the first input node, a first electrode connected to the gate output node and a second electrode which receives the second power voltage; and an eighth switching element including a control electrode connected to the masking control node, a first electrode which receives the first power voltage and a second electrode connected to the output control node.

15. The gate emission driver of claim 13, wherein the first driver comprises:

a first first gate switching element including a control electrode which receives one of a first clock signal and a second clock signal, a first electrode which receives the previous carry signal and a second electrode connected to the a first first gate node;

a second first gate switching element including a control electrode which receives the other of the first clock signal and the second clock signal, a first electrode which receives the previous carry signal and a second electrode connected to the first first gate node;

a third first gate switching element including a control electrode connected to the first first gate node, a first electrode which receives the first power voltage and a second electrode connected to a second first gate node;

a fourth first gate switching element including a control electrode connected to the first first gate node, a first electrode connected to the second first gate node and a second electrode which receives the second power voltage;

a fifth first gate switching element including a control electrode connected to the second first gate node, a first electrode which receives the first power voltage and a second electrode connected to a carry output node; and a sixth first gate switching element including a control electrode connected to the second first gate node, a first electrode connected to the carry output node and a second electrode which receives the second power voltage, wherein the first first gate switching element, the third first gate switching element and the fifth first gate switching element are P-type transistors, wherein the second first gate switching element, the fourth first gate switching element and the sixth first gate switching element are N-type transistors, and wherein the gate node connected to the first input node is the second first gate node.

16. The gate emission driver of claim 13, wherein the first driver comprises:

a first first gate switching element including a control electrode which receives one of a first clock signal and a second clock signal, a first electrode which receives the previous carry signal and a second electrode connected to a first first gate node;

a third first gate switching element including a control electrode connected to the first first gate node, a first electrode which receives the first power voltage and a second electrode connected to a second first gate node;

a fourth first gate switching element including a control electrode connected to the first first gate node, a first electrode connected to the second first gate node and a second electrode which receives the second power voltage;

a fifth first gate switching element including a control electrode connected to the second first gate node, a first electrode which receives the first power voltage and a second electrode connected to a carry output node; and a sixth first gate switching element including a control electrode connected to the second first gate node, a first electrode connected to the carry output node and a second electrode which receives the second power voltage, wherein the first first gate switching element, the third first gate switching element and the fifth first gate switching element are P-type transistors, and wherein the fourth first gate switching element and the sixth first gate switching element are N-type transistors.

17. The gate emission driver of claim 13, wherein the second driver comprises:

a first second gate switching element including a control electrode which receives one of a first clock signal and a second clock signal, a first electrode which receives the previous second gate signal and a second electrode connected to a first second gate node;

a second second gate switching element including a control electrode which receives the other of the first clock signal and the second clock signal, a first electrode which receives the previous second gate signal and a second electrode connected to the first second gate node;

a third second gate switching element including a control electrode connected to the first second gate node, a first electrode which receives the first power voltage and a second electrode connected to a second second gate node;

a fourth second gate switching element including a control electrode connected to the first second gate node, a first electrode connected to the second second gate node and a second electrode which receives the second power voltage;

a fifth second gate switching element including a control electrode connected to the second second gate node, a first electrode which receives the first power voltage and a second electrode connected to a second gate output node; and a sixth second gate switching element including a control electrode connected to the second second gate node, a first electrode connected to the second gate output node and a second electrode which receives the second power voltage, wherein the first second gate switching element, the third second gate switching element and the fifth second gate switching element are P-type transistors, wherein the second second gate switching element, the fourth second gate switching element and the sixth second gate switching element are N-type transistors, wherein the gate node connected to the second input node is the second second gate node, and wherein the output node connected to the third input node is the second gate output node.

18. The gate emission driver of claim 13, wherein the second driver comprises:

a first second gate switching element including a control electrode which receives one of a first clock signal and a second clock signal, a first electrode which receives the previous second gate signal and a second electrode connected to a first second gate node;

a third second gate switching element including a control electrode connected to the first second gate node, a first electrode which receives the first power voltage and a second electrode connected to a second second gate node;

a fourth second gate switching element including a control electrode connected to the first second gate node, a first electrode connected to the second second gate node and a second electrode which receives the second power voltage;

a fifth second gate switching element including a control electrode connected to the second second gate node, a first electrode which receives the first power voltage and a second electrode connected to a second gate output node; and a sixth second gate switching element including a control electrode connected to the second second gate node, a first electrode connected to the second gate output node and a second electrode which receives the second power voltage, wherein the first second gate switching element, the third second gate switching element and the fifth second gate switching element are P-type transistors, and wherein the fourth second gate switching element and the sixth second gate switching element are N-type transistors.

19. An electronic device comprising:

a processor; and a display apparatus connected to the processor, wherein the display apparatus comprises:

a display panel including a pixel;

a gate emission driver which outputs a gate signal and an emission signal to the pixel; and a data driver which outputs a data voltage to the pixel, wherein the gate emission driver comprises:

a first driver which generates a carry signal of a first gate signal based on a previous carry signal of the first gate signal;

a second driver which generates a second gate signal based on a previous second gate signal;

a third driver which generates the emission signal based on a previous emission signal; and a gate signal masking circuit which controls an output of the first gate signal based on an enable signal, based on a signal of a first input node thereof connected to a gate node of the first driver, based on a signal of a second input node thereof connected to a gate node of the second driver, based on a signal of a third input node thereof connected to an output node of the second driver, and based on the emission signal.

20. The electronic device of claim 19, wherein the third driver is disposed at a first side of the display panel, wherein the first driver and the second driver are disposed at a second side of the display panel, and wherein the gate signal masking circuit receives the emission signal from an outermost pixel of the display panel in a first direction.

* * * * *